E. GABEL.
SHADE FOR HEADLIGHTS.
APPLICATION FILED OCT. 27, 1916.

1,221,305.

Patented Apr. 3, 1917.

INVENTOR.
EDWARD GABEL
Thomas L. Wilder
ATTORNEY

UNITED STATES PATENT OFFICE.

EDWARD GABEL, OF UTICA, NEW YORK.

SHADE FOR HEADLIGHTS.

1,221,305.  Specification of Letters Patent.  Patented Apr. 3, 1917.

Application filed October 27, 1916.  Serial No. 128,108.

*To all whom it may concern:*

Be it known that I, EDWARD GABEL, a citizen of the United States, residing at Utica, in the county of Oneida and State of New York, have invented certain new and useful Improvements in Shades for Headlights, of which the following is a specification, reference being had therein to the accompanying drawing.

My invention relates to a shade for headlights and I declare the following to be a full, clear, concise and exact description thereof sufficient to enable anyone skilled in the art to which it appertains to make and use the same reference being had to the accompanying drawings in which like reference characters refer to like parts throughout the specification.

Th object of the invention is to provide a simple, efficient device that can be detachably connected to the head lights of automobiles or other vehicles, whereby to prevent the strong glare of the said lights from blinding pedestrians or other parties approaching.

The invention accomplishes this object by employing a shade that shuts off the rays of light thrown upward without diminishing the normal intensity of the rays thrown directly ahead of the vehicle to illuminate the road a sufficient distance in front to run the vehicle at any given speed with comparative safety.

A modification of the device is shown also, which permits of the adjustment of the shade relative to the head light, so as to control the direction of the rays of light with respect to the road.

The object will appear by reference to the drawings in which.

Figure 1:
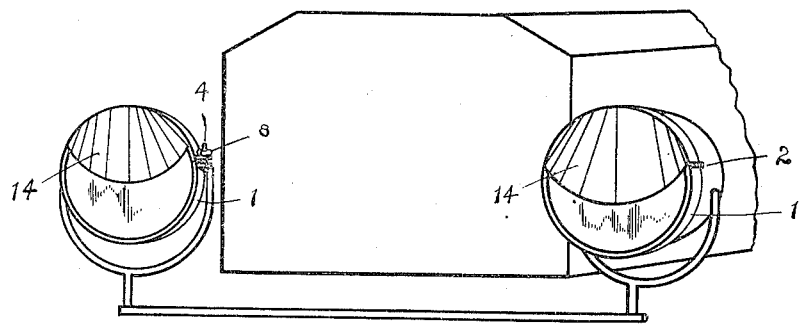
Figure 1 is a perspective view, showing a fragment of an automobile with the headlights and detachable shades.
Figure 2:
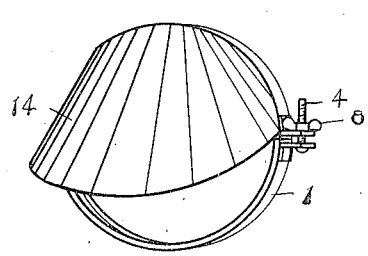
Fig. 2 is an enlarged perspective view of the detachable shade.
Figure 3:
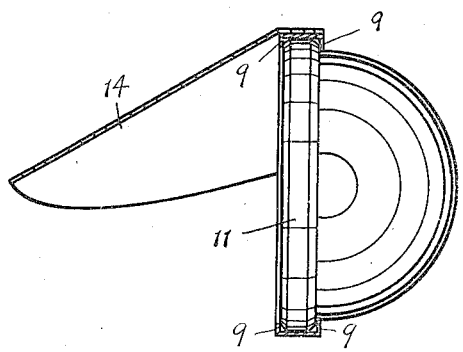
Fig. 3 is an enlarged view showing a side elevation of a head light and the shade in section attached.

Referring more particularly to the drawings, a ring —1— which is made in two parts joined by a hinge 2 is employed. Brackets 3 are secured to the free ends of the ring —1—, diametrically opposite the hinge 2. The brackets 3 are adapted to lie adjacent each other to be locked together by a headed bolt 4 or other means, that passes through suitable apertures formed in said brackets. The thumb nut 8 is intended to be turned down upon the bolt 4 into engagement with the surface of the upper bracket 3, whereby to draw the said brackets 3 toward each other to assemble the shade to the head light. This arrangement of the bolt 4 and thumb nut 8 to draw the ends together, allows for any variation in the circumference of the part of the headlight to which the shade is attached.

The ring —1— is provided with the lateral flanges 9—9 to form a chamber 10 therebetween. The chamber 10 is adapted to fit over the outer ridge 11 of the head light, so as to aid in holding the shade assembled to the head light, when the brackets 3 are drawn toward each other by tightening the nut 8 upon the bolt 4. A shade 14 is secured by solder or other suitable means to the ring —1—.

Figure 4:
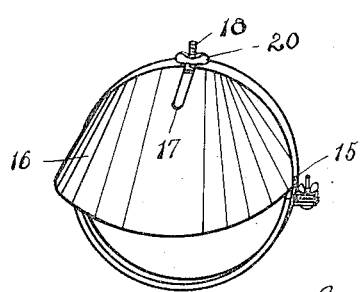
Fig. 4 is an enlarged perspective view of a modification of the shade.
Figure 5:
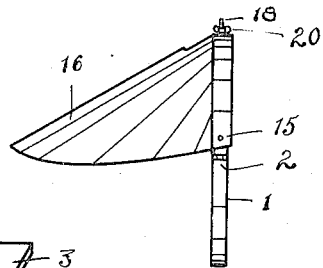
Fig. 5 is an enlarged view showing a side elevation of the modified form of shade.
Figure 6:
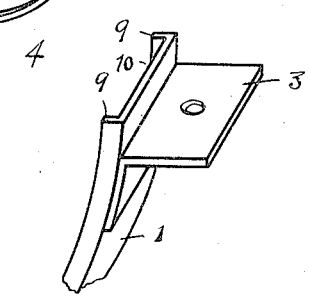
Fig. 6 is an enlarged view, showing a fragment of a ring with bracket attached, that is employed.

Figs. 4 and 5 illustrate a modification embodying a ring —1—, as heretofore, to which is pivoted at diametrically opposite points, as at 15—15 the shade 16. The shade 16 has a slot 17 through which projects a threaded bolt 18 fixedly secured to the ring —1—. The shade 16 may be turned upon its pivot 15—15 relative to the ring —1—, whereby to shade more or less of the head light, and thereby direct the rays of light either upward or downward, and as thus turned held in the given position by the thumb nut 20 that can be turned down upon the bolt 18 into engagement with the adjacent surface of the shade 16.

Having thus described my invention what I claim as new and desire to secure by Letters Patent is:

1. In a shade for headlights, a ring formed in two parts united by a hinge, an annular chamber in said ring, a shade attached to said ring, and a bolt and thumb-nut for holding said ring in assembled position relative to the head light, whereby the shade will direct the light in a given location.

2. In a shade for headlights, a ring having an annular chamber and formed in two parts, united by a hinge, a shade attached to said ring, and a bolt and thumb nut for holding said ring in assembled position relative to said headlight, whereby the shade will direct the rays of light in a given location.

3. In a shade for headlights, a ring having a shade pivoted thereto, a slot in said shade, a bolt attached to said ring, said bolt projecting up through the slot in said shade, and a thumb nut mounted upon said bolt, whereby to hold said shade in adjusted position.

4. In a shade for headlights, a ring formed in two parts, a hinge uniting said parts, a shade pivoted to one of the parts of said ring, a slot in said shade, and a bolt and thumb nut for holding said shade in adjusted position relative to said ring.

5. In a shade for headlights, a ring formed in two parts, a hinge uniting said parts, flanges on said ring forming an annular chamber, a shade pivoted to said ring, a slot in said shade, and a bolt and thumb nut for holding said shade in adjusted position relative to said ring, whereby to cast the rays of light in any given direction.

In testimony whereof I have affixed my signature.

EDWARD GABEL.